US012762222B2

(12) United States Patent
Bhavsar et al.

(10) Patent No.: US 12,762,222 B2
(45) Date of Patent: Oct. 13, 2026

(54) GENERATING USABLE HIGH ENTROPY PASSPHRASES IN LOCAL LANGUAGE FROM PERSONALIZED INTERSECTION CORPUS

(71) Applicant: Tata Consultancy Services Limited, Mumbai (IN)

(72) Inventors: Karan Rajesh Bhavsar, Thane (IN); Pankaj Harish Doke, Thane (IN); Sujit Raghunath Shinde, Thane (IN); Sanjay Madhukar Kimbahune, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 66 days.

(21) Appl. No.: 19/089,620

(22) Filed: Mar. 25, 2025

(65) Prior Publication Data

US 2025/0335572 A1 Oct. 30, 2025

(30) Foreign Application Priority Data

Apr. 29, 2024 (IN) ............................ 202421033725

(51) Int. Cl.
*G06F 21/00* (2013.01)
*G06F 21/46* (2013.01)
*G10L 15/26* (2006.01)

(52) U.S. Cl.
CPC .............. *G06F 21/46* (2013.01); *G10L 15/26* (2013.01)

(58) Field of Classification Search
None
See application file for complete search history.

(56) References Cited

U.S. PATENT DOCUMENTS 8,755,837 B2 * 6/2014 Rhoads .................. G06F 16/50 382/312
10,223,512 B2 * 3/2019 Pellom ................. G06F 16/683
(Continued)

OTHER PUBLICATIONS

Gagnon, Luc et al. Password-dependent speaker verification using quantized acoustic trajectories. 2001 IEEE International Conference on Acoustics, Speech, and Signal Processing. Proceedings (Cat. No. 01CH37221). https://ieeexplore.ieee.org/stamp/stamp.jsp?tp=&arnumber=940864 (Year: 2001).*
(Continued)

*Primary Examiner* — Jeremiah L Avery
(74) *Attorney, Agent, or Firm* — Finnegan, Henderson, Farabow, Garrett & Dunner, LLP

(57) ABSTRACT

There are technical challenges to address the technical capability limitations of a Basic Emergent User (BEU) to enable and assist in generating high entropy passphrases but are easier for recall. Generation usable high entropy passphrases in local language from personalized intersection corpus for device authentication set up for BEU is provided. A recallable phrase, spoken by the BEU in local language, is converted to a text and Seed List Words (SLWs) are filtered based on a pre-generated personalized intersection corpus. Passphrase distance matrix is generated for the SLWs using the personalized intersection corpus. Words associated with each SLW are arranged in descending order of vector distance or entropy. Words of same order are concatenated in for each SLW to generate passphrase corpus. Randomly selected passphrases are read out and displayed on the user device by positioning the highest entropy based on usability of display screen in context of the user.

12 Claims, 11 Drawing Sheets

(56) References Cited

U.S. PATENT DOCUMENTS

| | | | | |
|---|---|---|---|---|
| 11,128,636 | B1 * | 9/2021 | Jorasch | A61B 5/6803 |
| 11,429,712 | B2 | 8/2022 | Ortiz et al. | |
| 11,983,259 | B2 * | 5/2024 | Keret | G06F 21/32 |
| 12,206,783 | B2 * | 1/2025 | Streit | G06N 3/0442 |
| 2017/0039377 | A1 * | 2/2017 | Nicholls | G06Q 30/08 |
| 2019/0104120 | A1 * | 4/2019 | Arrowood | G06F 21/32 |
| 2019/0311098 | A1 * | 10/2019 | Baldwin | G06F 21/32 |
| 2020/0089854 | A1 * | 3/2020 | Tong | G10L 17/24 |
| 2024/0348436 | A1 * | 10/2024 | Cambou | H04L 9/0869 |

OTHER PUBLICATIONS

Pathak, Manas A.; Raj, Bhiksha. Privacy-preserving speaker verification as password matching. 2012 IEEE International Conference on Acoustics, Speech and Signal Processing (ICASSP). https://ieeexplore.ieee.org/stamp/stamp.jsp?tp=&arnumber=6288262 (Year: 2012).*

Nautsch, Andreas et al. Entropy analysis of i-vector feature spaces in duration-sensitive speaker recognition. 2015 IEEE International Conference on Acoustics, Speech and Signal Processing (ICASSP). https://ieeexplore.ieee.org/stamp/stamp.jsp?tp=&arnumber=7178857 (Year: 2015).*

Maazouzi, Abd-Errahim et al. A speaker recognition system using power spectrum density and similarity measurements. 2015 Third World Conference on Complex Systems (WCCS). https://ieeexplore.ieee.org/stamp/stamp.jsp?tp=&arnumber=7483213 (Year: 2015).*

Nikola K. Blanchard et al.; "Improving security and usability of passphrases with guided word choice", ACSAC '18: Proceedings of the 34th Annual Computer Security Applications Conference, ACM, pp. 723-732, (2018).

* cited by examiner

8 Test Combinations. The Tests will be selected in Random Sequence.

| Test Number | Hand Selection | Finger Selection | Correct Pass Phrase Text Position | Text Alignment on Screen |
|---|---|---|---|---|
| 1 | Left | Thumb | Top | Right Aligned |
| 2 | Left | Thumb | Bottom | Right Aligned |
| 3 | Left | Index | Top | Right Aligned |
| 4 | Left | Index | Bottom | Right Aligned |
| 5 | Right | Thumb | Top | Left Aligned |
| 6 | Right | Thumb | Bottom | Left Aligned |
| 7 | Right | Index | Top | Left Aligned |
| 8 | Right | Index | Bottom | Left Aligned |

FIG. 4C

Test Score Calculation based on Time to Respond

| Test Number | Least Time to Max Time (Seconds) | Passphrase |
|---|---|---|
| **4** | **1.3** | **Lorem Ipsum Lorem Ipsum Lorem** |
| 5 | 1.35 | Lorem Ipsum Lorem Ipsum Lorem |
| 8 | 1.45 | Lorem Ipsum Lorem Ipsum Lorem |
| 7 | 1.49 | Lorem Ipsum Lorem Ipsum Lorem |
| 6 | 1.55 | Lorem Ipsum Lorem Ipsum Lorem |
| 3 | 2 | Lorem Ipsum Lorem Ipsum Lorem |
| 1 | 2.3 | Lorem Ipsum Lorem Ipsum Lorem |
| 2 | 2.45 | Lorem Ipsum Lorem Ipsum Lorem |

→

As per the Test Results for Pass Phrase selection.

Test number 4 gives the Best Suitable Layout for Usability.

This will be the default layout for the user.

FIG. 4D

GENERATING USABLE HIGH ENTROPY PASSPHRASES IN LOCAL LANGUAGE FROM PERSONALIZED INTERSECTION CORPUS

PRIORITY CLAIM

This U.S. patent application claims priority under 35 U.S.C. § 119 to: Indian Patent Application number 202421033725, filed on Apr. 29, 2024. The entire contents of the aforementioned application are incorporated herein by reference.

TECHNICAL FIELD

The embodiments herein generally relate to the field of device authentication set up techniques and, more particularly, to a method and system for generating usable high entropy passphrases in local language from personalized intersection corpus for device authentication set up for a Basic Emergent User (BEU).

BACKGROUND

With user devices functioning as gateway to personal, financial, and other information of an individual, device authentication techniques need to be robust. However, setting unique passwords or passphrases that are challenging to guess still remains a challenge for Basic Emergent Users (BEUs), who are in the less-literate or non-tech-savvy user category. As of today, there are no robust tools addressing the challenges of BEU in password or passphrase generation, where the BEU is assisted to generate higher entropy passphrases from the limited vocabulary they have. So, they tend to generate passphrases which are simple and easy to recall for them. This makes them vulnerable to dictionary attacks or attacks from people known to them in their social circle.

Ther have been attempts such as in work in the literature titled '*Improving security and usability of passphrases with guided word choice*' by Nikola K. Blanchard et. al. The above work proposes a way of making more memorable, more secure passphrases. by choosing from a randomly generated set of words presented as a two-dimensional array. The above work is based on a random corpus, for a general user.

However, there is no focus for BEU category, which needs challenges such as limited vocabulary, English language challenges, and local accent to be addressed. Furthermore, one of the important feature for BEU specific passphrase generation is that the passphrase suggested should have high entropy for the adversary, but the recall should be easy for the BEU, thus should be a low entropy passphrase.

SUMMARY

Embodiments of the present disclosure present technological improvements as solutions to one or more of the above-mentioned technical problems recognized by the inventors in conventional systems.

For example, in one embodiment, a method for high entropy passphrase generation is provided. The method includes prompting a user, to speak out a recallable phrase comprising a set of words using the natural language of the user, wherein the recallable phrase is converted to a text using an Automated Speech Recognition (ASR) engine.

Further, the method includes filtering a set of Seed List Words (SLWs) from the recallable phrase by based on a personalized intersection corpus comprising a plurality of words correctly identifiable by the ASR engine.

Further, the method includes generating a passphrase distance matrix for the set of SLWs by referring to an intersection corpus distance matrix generated for the personalized intersection corpus based on a vector distance between each of the plurality of words in the personalized intersection corpus, wherein column elements of the passphrase distance matrix comprise the set of SLWs in alphabetical order and row elements comprise a predefined number of passphrase words, for each SLW among the set of SLWs, identified based on descending order of the vector distance between each SLW and the plurality of words of the personalized intersection corpus, and wherein the descending order of vector distance arranges the predefined number of passphrase words from high entropy to low entropy value.

Further, the method includes performing column wise splitting of the passphrase distance matrix to generate a plurality of splits, wherein each of the plurality of splits comprising a predefined number of words for each SLW, wherein a first split to a last split comprising words with higher vector distance resulting in low entropy;

Furthermore, the method includes generating a passphrase corpus comprising a plurality of passphrases generated from at least one of the first spilt and a subsequent split by a row wise selection of words of the passphrase matrix one at a time;

Further, the method includes randomly reading out and displaying a preset number of passphrases from among the plurality of phrases on a display screen of the user device, wherein a passphrase among the preset number of passphrases associated with the high entropy words is positioned at a display screen position having highest usability in context of the use. Furthermore, the method includes setting a user selected passphrase for device access authentication of the user device.

In another aspect, a system, also referred to as user device, for high entropy passphrase generation is provided. The system comprises a memory storing instructions; one or more Input/Output (I/O) interfaces; and one or more hardware processors coupled to the memory via the one or more I/O interfaces, wherein the one or more hardware processors are configured by the instructions to In yet another aspect, there are provided one or more non-transitory machine-readable information storage mediums comprising one or more instructions, which when executed by one or more hardware processors causes a method for high entropy passphrase generation.

The one or more hardware processors are configured to prompt a user, to speak out a recallable phrase comprising a set of words using the natural language of the user, wherein the recallable phrase is converted to a text using an Automated Speech Recognition (ASR) engine.

Further, the one or more hardware processors are configured to filter a set of Seed List Words (SLWs) from the recallable phrase by based on a personalized intersection corpus comprising a plurality of words correctly identifiable by the ASR engine.

Further, the one or more hardware processors are configured to generate a passphrase distance matrix for the set of SLWs by referring to an intersection corpus distance matrix generated for the personalized intersection corpus based on a vector distance between each of the plurality of words in the personalized intersection corpus, wherein column elements of the passphrase distance matrix comprise the set of SLWs in alphabetical order and row elements comprise a predefined number of passphrase words, for each SLW among the set of SLWs, identified based on descending order of the vector distance between each SLW and the plurality of words of the personalized intersection corpus, and wherein the descending order of vector distance arranges the predefined number of passphrase words from high entropy to low entropy value.

Further, the one or more hardware processors are configured to perform column wise splitting of the passphrase distance matrix to generate a plurality of splits, wherein each of the plurality of splits comprising a predefined number of words for each SLW, wherein a first split to a last split comprising words with higher vector distance resulting in high entropy words gradually shifting to lower vector distance resulting in low entropy;

Furthermore, the one or more hardware processors are configured to generate a passphrase corpus comprising a plurality of passphrases generated from at least one of the first spilt and a subsequent split by a row wise selection of words of the passphrase matrix one at a time;

Further, the one or more hardware processors are configured to randomly read out and display a preset number of passphrases from among the plurality of phrases on a display screen of the user device, wherein a passphrase among the preset number of passphrases associated with the high entropy words is positioned at a display screen position having highest usability in context of the use. Furthermore, the method includes setting a user selected passphrase for device access authentication of the user device.

The method includes prompting a user, to speak out a recallable phrase comprising a set of words using the natural language of the user, wherein the recallable phrase is converted to a text using an Automated Speech Recognition (ASR) engine.

Further, the method includes filtering a set of Seed List Words (SLWs) from the recallable phrase by based on a personalized intersection corpus comprising a plurality of words correctly identifiable by the ASR engine.

Further, the method includes generating a passphrase distance matrix for the set of SLWs by referring to an intersection corpus distance matrix generated for the personalized intersection corpus based on a vector distance between each of the plurality of words in the personalized intersection corpus, wherein column elements of the passphrase distance matrix comprise the set of SLWs in alphabetical order and row elements comprise a predefined number of passphrase words, for each SLW among the set of SLWs, identified based on descending order of the vector distance between each SLW and the plurality of words of the personalized intersection corpus, and wherein the descending order of vector distance arranges the predefined number of passphrase words from high entropy to low entropy value.

Further, the method includes performing column wise splitting of the passphrase distance matrix to generate a plurality of splits, wherein each of the plurality of splits comprising a predefined number of words for each SLW, wherein a first split to a last split comprising words with higher vector distance resulting in low entropy;

Furthermore, the method includes generating a passphrase corpus comprising a plurality of passphrases generated from at least one of the first spilt and a subsequent split by a row wise selection of words of the passphrase matrix one at a time;

Further, the method includes randomly reading out and displaying a preset number of passphrases from among the plurality of phrases on a display screen of the user device, wherein a passphrase among the preset number of passphrases associated with the high entropy words is positioned at a display screen position having highest usability in context of the use. Furthermore, the method includes setting a user selected passphrase for device access authentication of the user device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 4A through 4D are example illustrations of display tests executed by the system of FIG. 1 to determine the screen usability for the user, in accordance with some embodiments of the present disclosure.

Figure 1:
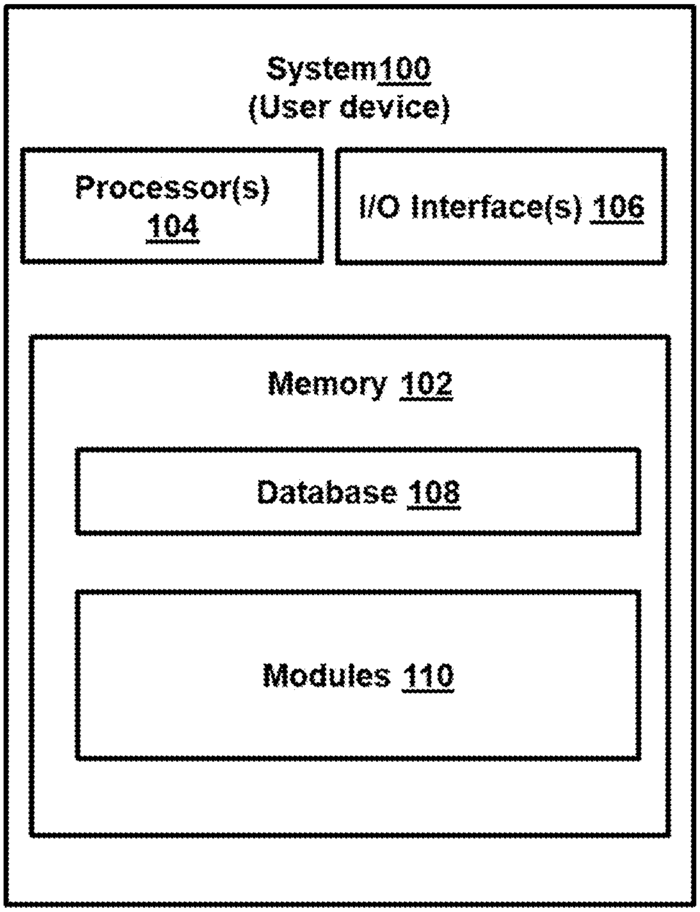
FIG. 1 is a functional block diagram of a system, for generating usable high entropy passphrases in local language from personalized intersection corpus for device authentication set up for a Basic Emergent User (BEU), in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There are technical challenges to address the technical capability limitations of a Basic Emergent User (BEU) to enable and assist BEU in generating high entropy passphrases but are easier for self-recall. For robust BEU specific passphrase set up, a BEU customized or personalized corpus is needed, which takes care of BEU's language capability, accent, further ease of selecting and setting the passphrase. As of today, there are no tools for BEU to generate higher entropy passphrases from the limited vocabulary they have. So, they generate passphrases which are simple and easy to recall for them. This makes them vulnerable to dictionary attacks or attacks from people known to them in their social circle. The keyboard layout on the smartphone for their password or passphrase selection is also not optimal for input from their physiology perspective.

Embodiments of the present disclosure provide a method and system for generating usable high entropy passphrases in local language from personalized intersection corpus for device authentication set up of user device of a Basic Emergent User (BEU), also referred to as user. A recallable phrase (user's favorite phrase) spoken by the BEU in local language, is converted to a text and Seed List Words (SLWs) are filtered based on a pre-generated personalized intersection corpus. A passphrase distance matrix is generated for the SLWs by referring to an intersection corpus distance matrix generated for the personalized intersection corpus. Words associated with each SLW are arranged in descending order of vector distance or entropy. Words of same order are concatenated in for each SLW to generate passphrase corpus. Randomly selected passphrases are read out and displayed on the user device by positioning the highest entropy passphrase at the most usable display screen position, nudging the user to select high entropy passphrase.

It can be noted that the recallable phrase that the user is asked to read out, or the passphrase generated from the user read out phrase have a word limitation of five words. This limitation is obtained based on Miller's criteria for memory capacity for a person (herein, the BEU)

Referring now to the drawings, and more particularly to FIGS. 1 through 4D, where similar reference characters denote corresponding features consistently throughout the figures, there are shown preferred embodiments, and these embodiments are described in the context of the following exemplary system and/or method.

FIG. 1 is a functional block diagram of a system 100, also referred to as user device 100, for generating usable high entropy passphrases in local language from personalized intersection corpus for device authentication set up for a Basic Emergent User (BEU), in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface, a microphone and speaker interface for reading out to user and receiving user voice commands, phrases during passphrase generation, passphrases spoken for device authentication and the like. The I/O interface 106 can facilitate multiple communications within a wide variety of networks N/W and protocol types, including wired networks, for example, LAN, cable, etc., and wireless networks, such as WLAN, cellular and the like. In an embodiment, the I/O interface(s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110. The plurality of modules 110 include programs or coded instructions that supplement applications or functions performed by the system 100 for executing different steps involved in the process of high entropy passphrase generation for the BEU, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown) such as an Automated Speech Recognition (ASR) engine or the ASR engine can be accessed via Application Programming Interfaces (APIs).

Further, the memory 102 may comprise information pertaining to input(s)/output(s) of each step performed by the processor(s) 104 of the system 100 and methods of the present disclosure.

Further, the memory 102 includes a database 108. The database (or repository) 108 may include a plurality of abstracted pieces of code for refinement and data that is processed, received, or generated as a result of the execution of the plurality of modules in the module(s) 110. The database 108 can store the intersection passphrase corpus, passphrase distance matrix, the personalized intersection corpus, the passphrase corpus and the like.

Although the data base 108 is shown internal to the system 100, it will be noted that, in alternate embodiments, the database 108 can also be implemented external to the system 100, and communicatively coupled to the system 100. The data contained within such an external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 through FIG. 4D.

Figure 2A:
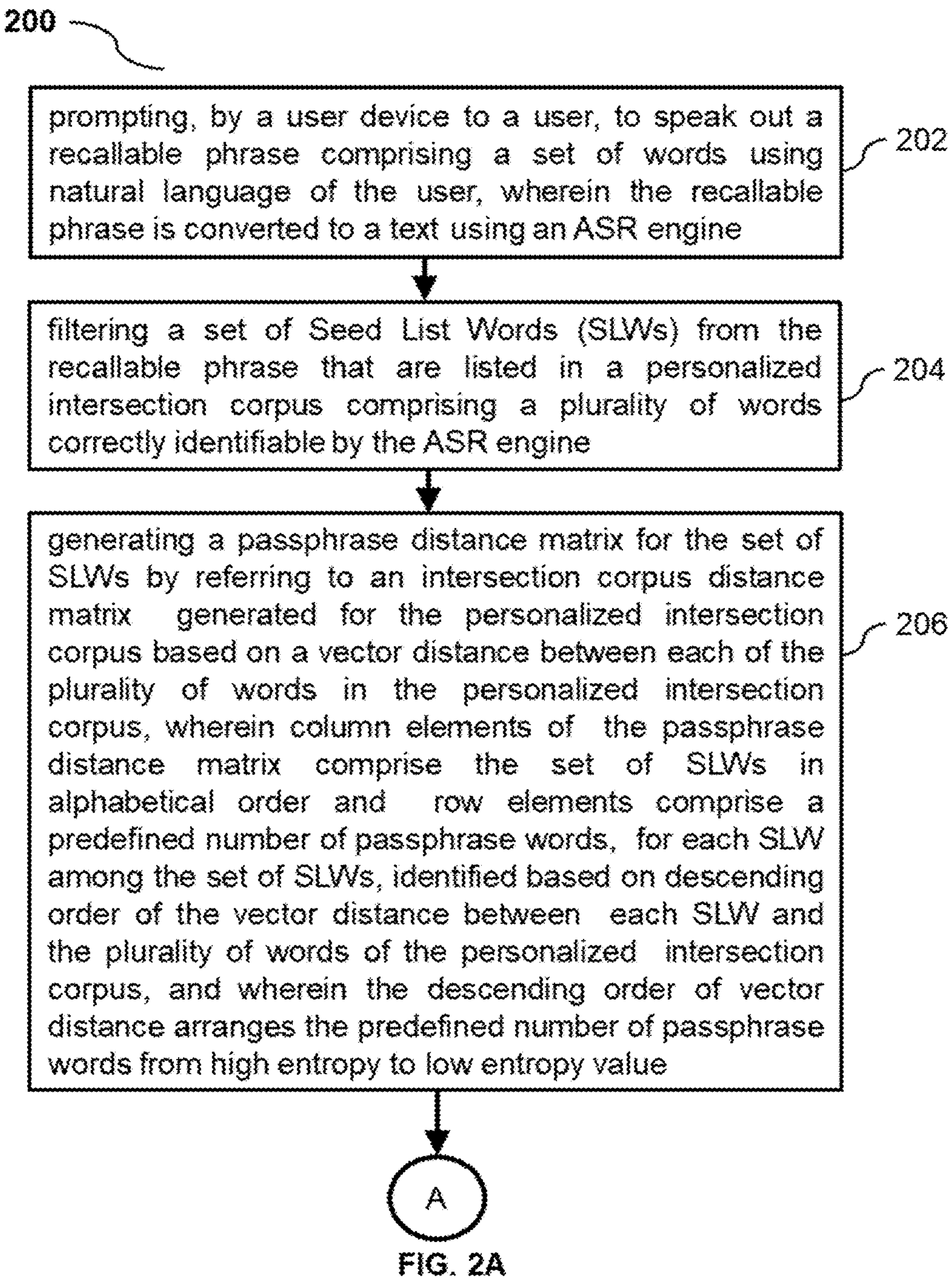
FIGS. 2A through 2B (collectively referred as FIG. 2) is a flow diagram illustrating a method for generating usable high entropy passphrases in local language from personalized intersection corpus for device authentication set up for a Basic Emergent User (BEU), using the system depicted in FIG. 1, in accordance with some embodiments of the present disclosure.
Figure 2B:
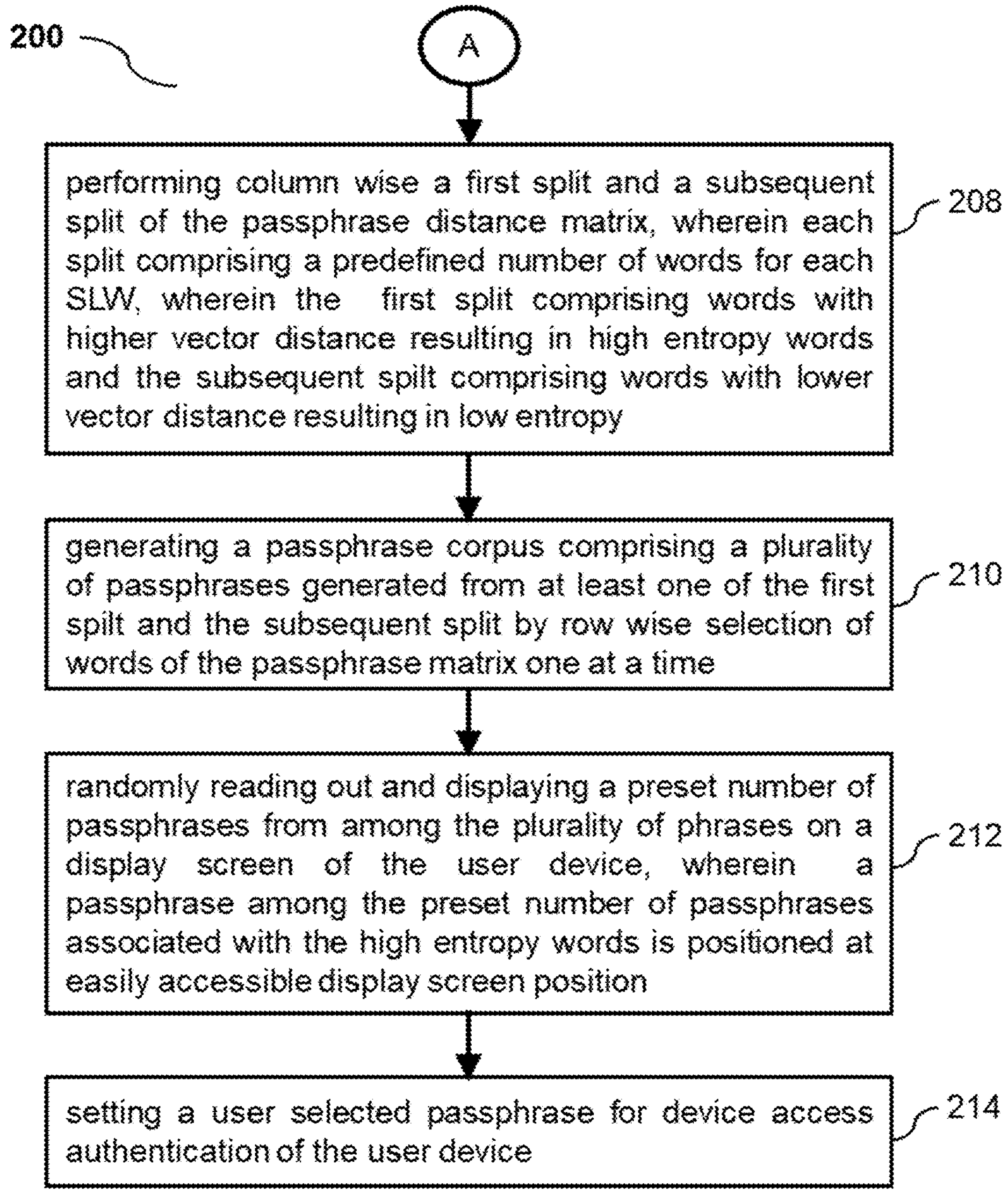

FIGS. 2A through 2B (collectively referred as FIG. 2) is a flow diagram illustrating a method 200 for generating usable high entropy passphrases in local language from personalized intersection corpus for device authentication set up for a Basic Emergent User (BEU), using the system depicted in FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Figure 3A:
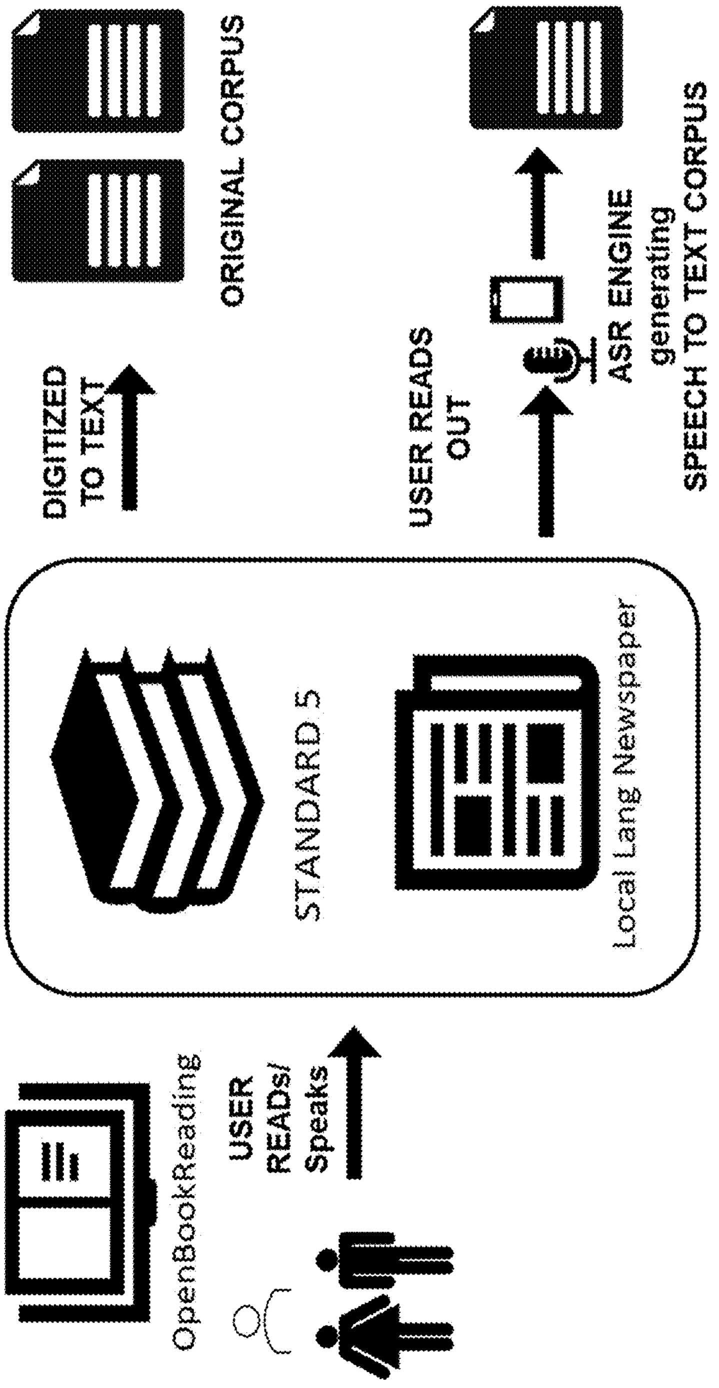
FIGS. 3A through 3D are example illustrations of personalized intersection corpus generation, intersection corpus distance matrix generation, and passphrase selection process of the system of FIG. 1, in accordance with some embodiments of the present disclosure.
Figure 3B:
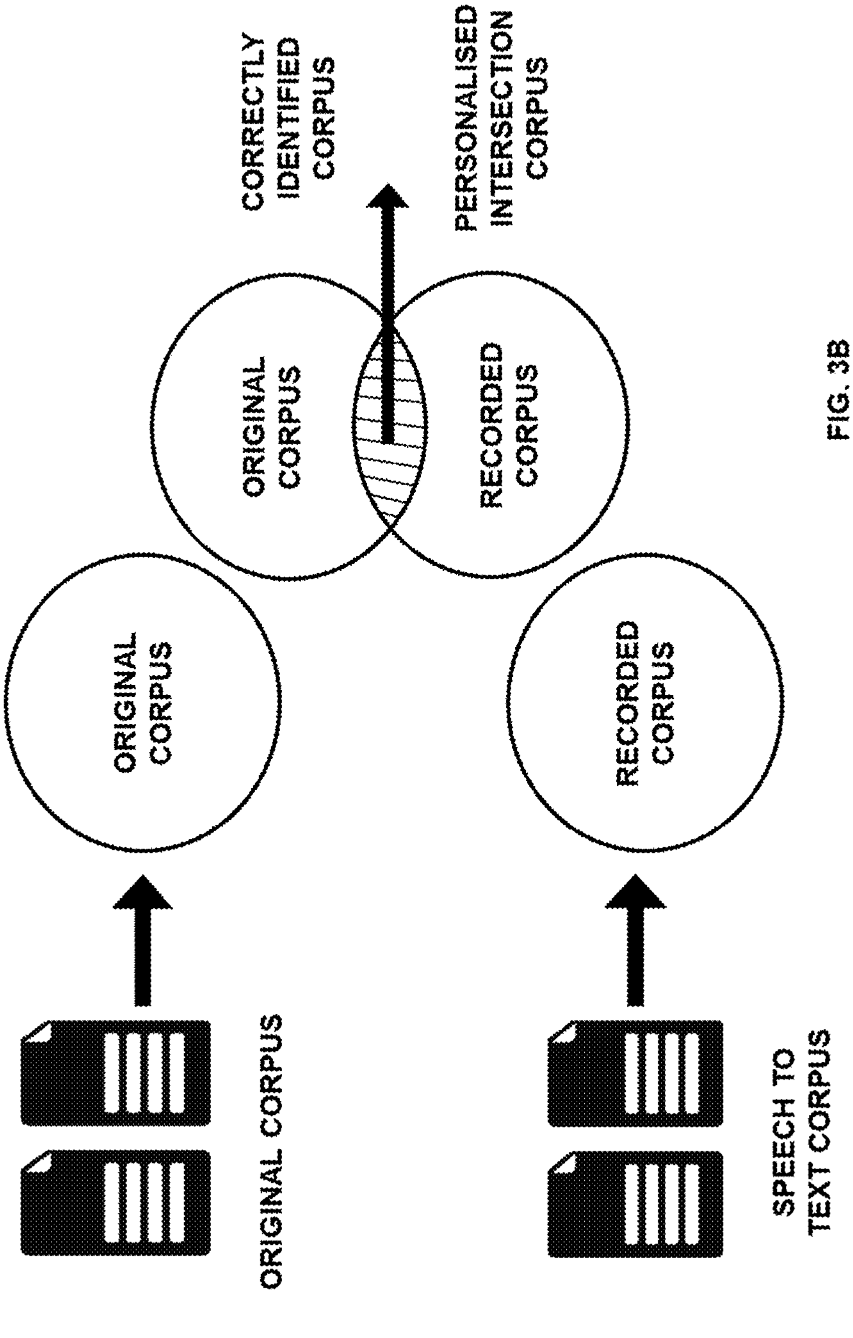
Figure 3C:
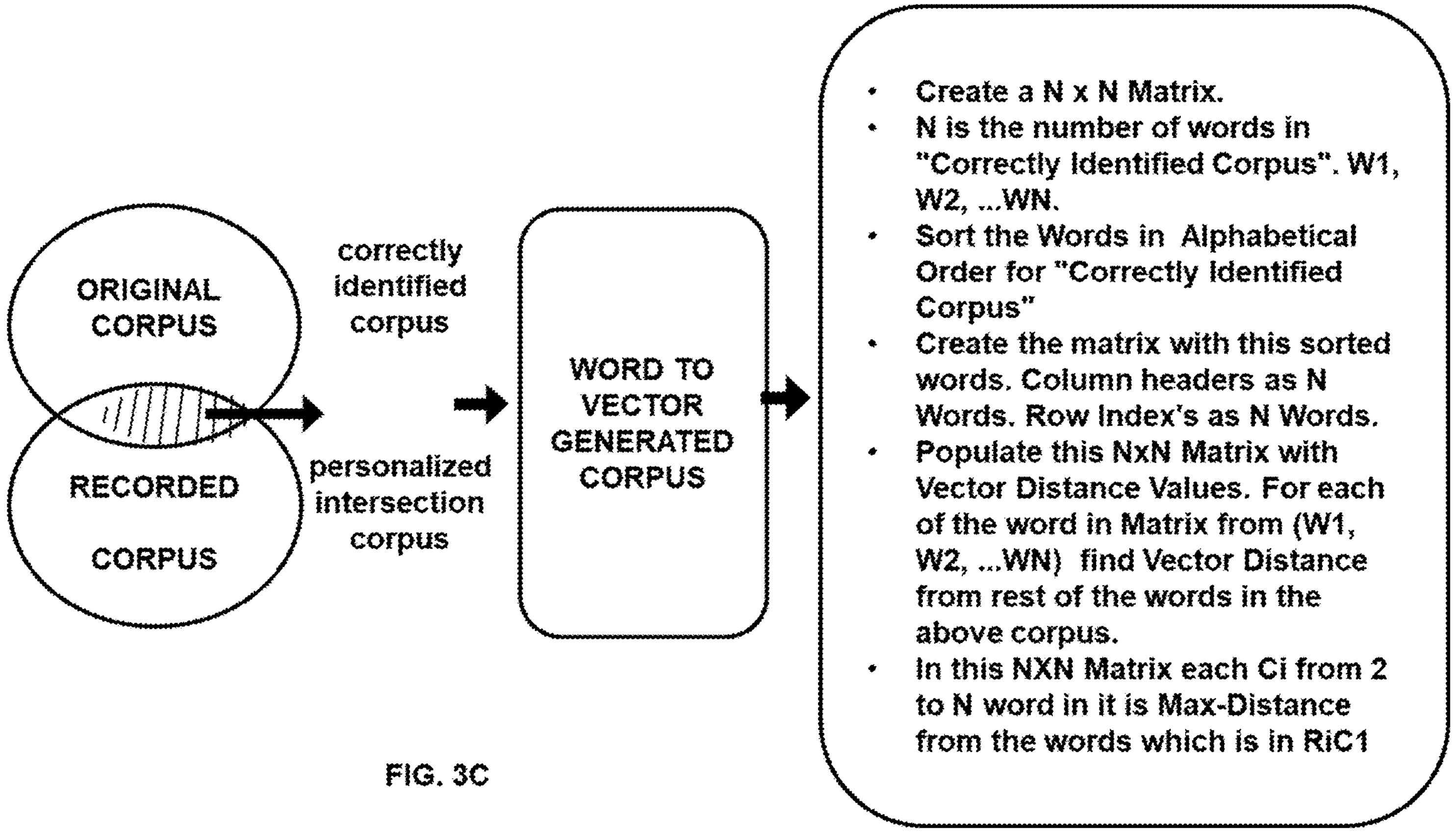
Figure 3D:
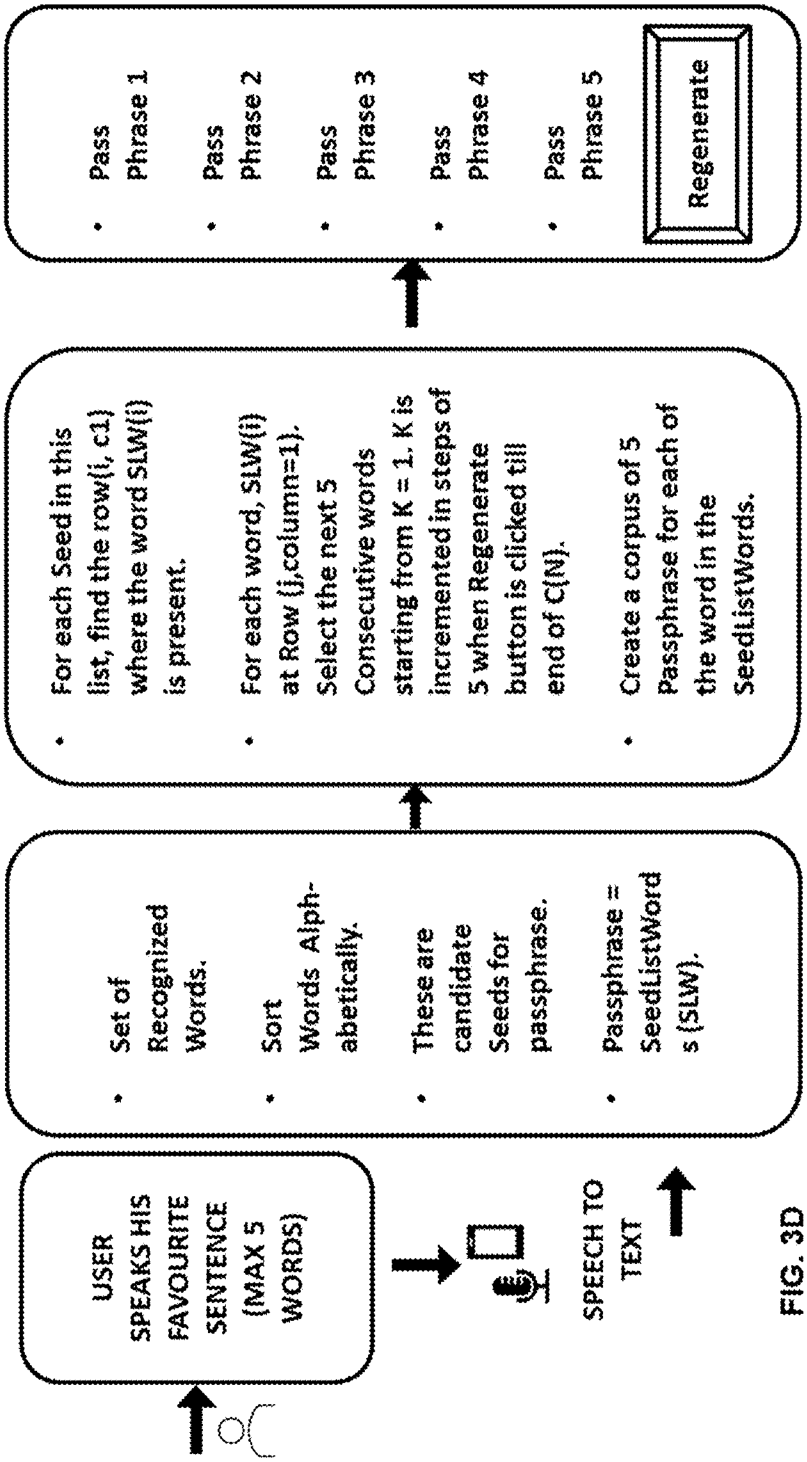
Figure 4A:
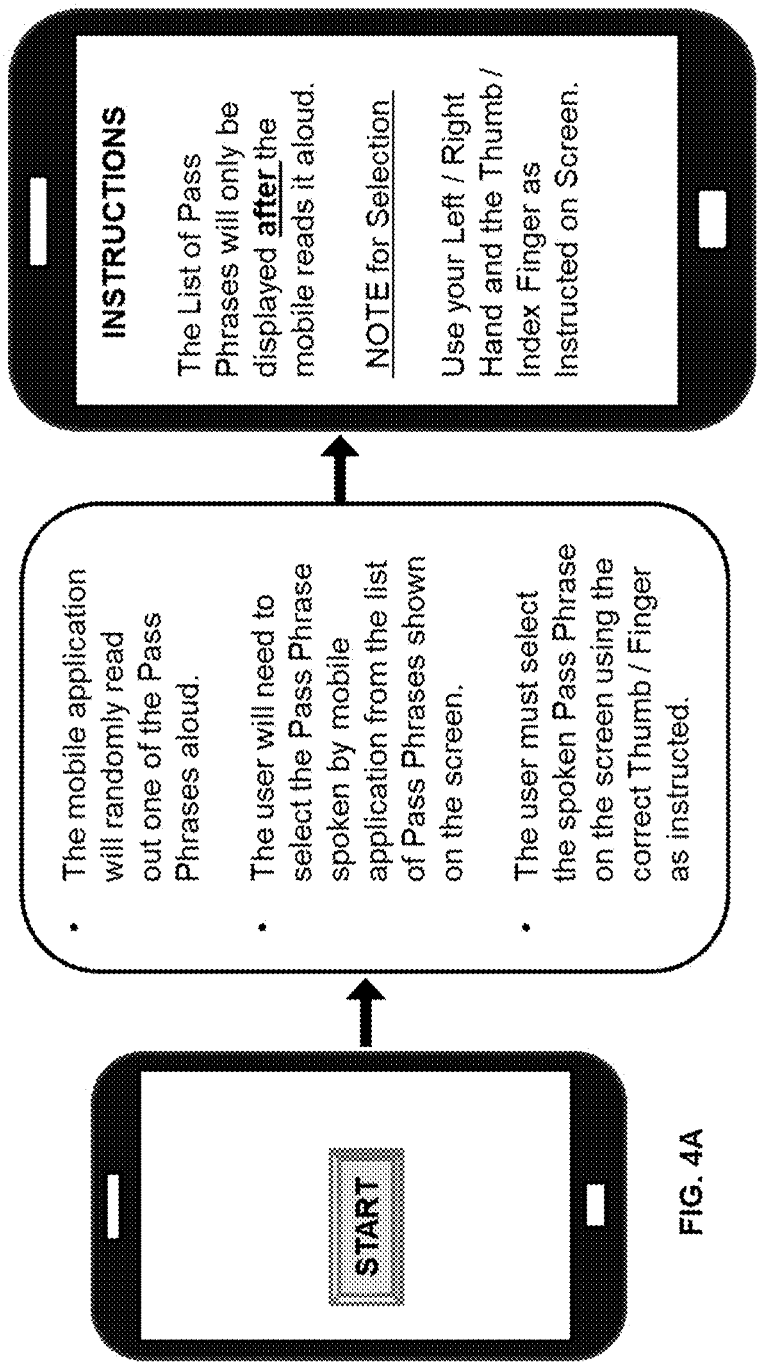
Figure 4B:
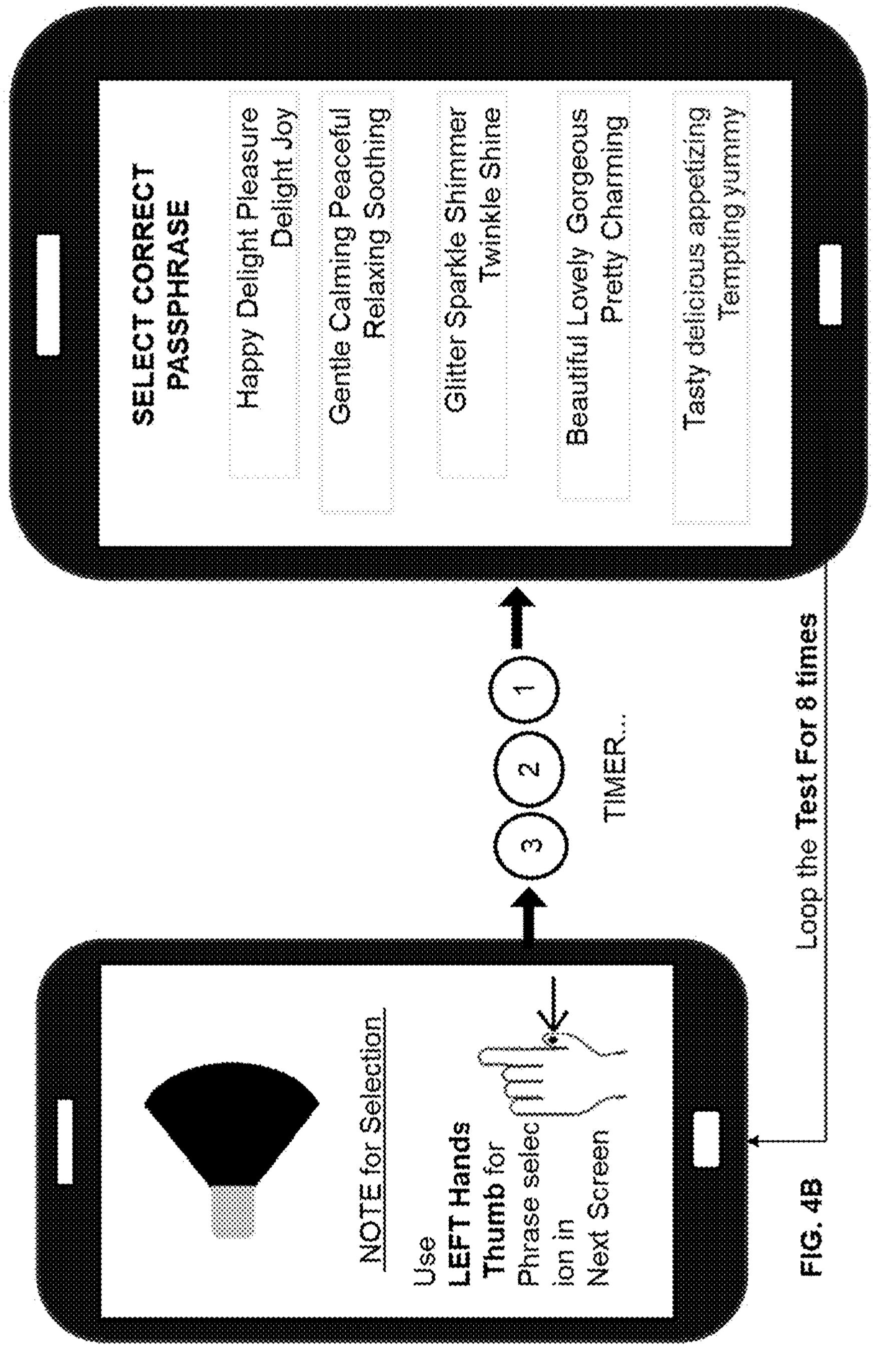

The method 200, pre-generates the personalized intersection corpus and the intersection corpus distance matrix, which is an one-time setup. FIGS. 3A. 3B and 3C are example illustrations of personalized intersection corpus generation. The intersection corpus is unique per BEU, but once generated standardized for all repeat operations for that BEU. Intersection corpus distance matrix generation process of the system of FIG. 1, comprising the steps of:

1. Generation of an original corpus by extracting words from preidentified literature comprising local language newspaper literature and local language school book literature accessible to the user. In one implementation school books of fifth standard are used. The same textbook corpus is administered to all BEU users to maintain standardization of the intervention.
2. Prompting user to speak out a plurality of phrases from the preidentified literature, wherein user is allowed to speak in natural language not restricted to follow accent or be present in a defined environment while speaking out the plurality of phrases. Thus, during corpus generation user can be in his natural environment, thus the surrounding noise, if any, a typical accent of the user get captured for specific user. This makes the corpus user environment and user accent specific, which also increases entropy for an adversary to guess the passphrase.
3. Generating text for each of the plurality of phrases to generate a recorded corpus, comprising words recognized by the ASR engine. The user spoken phrases are thus digitized.
4. Performing intersection of the original corpus and the pre-recorded corpus to generate the personalized intersection corpus, which represent a dataset common to ground truth and that of the ASR engine output. Say, the number of words in the personalized intersection matrix is N. The personalized corpus once generated remains the same for the specific user.
5. Generating the intersection corpus distance matrix (N×N) based on the vector distance between each word of the personalized intersection corpus. Techniques well known in art such as Word2vec represents a word as a high-dimension vector of numbers which capture relationships between words. In particular, words which appear in similar contexts are mapped to vectors which are nearby as measured by cosine similarity. This indicate the level of semantic similarity between the words. Thus, a N×N Matrix is created with each column having words w1, w2, wN. N is the number of words in SetInterSectCorpus (also referred to as personalized intersection corpus). Each row has words w1, w2, wN from the SetInterSectCorpus. Sort the SetIntersectCorpus alphabetically and then populate each row with this sorted words. (here N=number of words in the intersection corpus. That is word W(C,R)=W11 at location C1R1. The next column word is chosen whose distance from W11 is maximum as per word2vec. Word at C2R1 is hence W21=W11Max. Next word at C3R1 is chosen such that it is max distance from W31=W11Max-Sorted Entropy Index. Thus, generated is a N×N Matrix where each word in it is at C1Ri, wherein 'i' is the index from 1 to N.

Some works in literature refer to certain matrix generation approaches. For example, *Linguistic matrix theory* (*NPL*), by Dimitrios Kartsaklis et. al. However, the work merely cites a gaussian matrix method for corpus of data. It does not specify the precise construction approach and structuring the words in the corpus based on the distance to create an entropy representation for a given set of contextualized data as explained in Table 3 and 4.

Referring to the steps of the method 200, at step 202 of the method 200, the one or more hardware processors 104 are configured by the instructions to prompt the user of the user device (system 100) to a user, to speak out a recallable phrase comprising a set of words using natural language of the user. The user can select easily recallable phrase (favorite phrase), wherein the recallable phrase is converted to a text using the ASR engine. The entire steps 202 through 214 are explained using a use case example. Let the recallable phrase, which is also referred to herein after as phrase, be "Kashmir offers glimpse of paradise to people on earth" as spoken by the user.

At step 204 of the method 200, the one or more hardware processors 104 are configured by the instructions to filter a set of Seed List Words (SLWs) from the phrase based on the personalized intersection corpus, which comprises a plurality of words correctly identifiable by the ASR engine (N words as mentioned above). The set of selected recognized words SLWs are: Kashmir Offers Glimpse Paradise People Earth.

At step 206 of the method 200, the one or more hardware processors 104 are configured by the instructions to generate the passphrase distance matrix for the set of SLWs by referring to the intersection corpus distance matrix generated for the personalized intersection corpus based on a vector distance between each of the plurality of words in the personalized intersection corpus. The row elements of the passphrase distance matrix comprise the set of SLWs in alphabetical order. The column elements comprise a predefined number of passphrase words mapped to each of the SLWs and are associated words from the intersection distance matrix. The words in each column for the SLW are identified based on descending order of the vector distance between each SLW and the plurality of words of the personalized intersection corpus. The descending order of vector distance indicates arranging words from less similar to more similar words w.r.t SLW. The entropy theory in security can be understood as "A Measure of the amount of Uncertainty an Attacker faces to determine the content of interest". It is also a measure of unpredictability in a String of Data Set. Thus, increase in vector distance indicates less similar is the word to the seed word for an attacker to guess and hence has high entropy. Vice versa it can be understood when words are referred to as low entropy w.r.t the SLW. Thus, the method herein arranges the predefined number of passphrase based on vector distance generating a high entropy to low entropy word sequence for each SLW. Example in Table 2 explains the same, wherein for the word earth Planet is the highest similarity word while sphere is least similarity word. Thus. 'sphere' is placed earlier and 'planet' later (highest to lowest entropy).

For the user spoken phrase in the example above, Alphabetical order is: Earth Glimpse Kashmir Offers Paradise People At step 208 of the method 200, the one or more hardware processors 104 are configured by the instructions to column wise perform a plurality of splits of the passphrase distance matrix, with each split covering 5 words, the number identified based on with Miller's criteria. Thus, the maximum number of splits are N/5. An example first split and a subsequent split (interchangeably also referred to as second split) of the passphrase distance matrix is depicted in the use case example explained herein. Each split comprising a predefined number of words (herein, 5 is the spilt length derived from Miller's criteria for memory capacity for recall) for each SLW as seen in Table 1 and Table 2 below with 5 words per split (in accordance with Miller's criteria). The first split comprising words with higher vector distance resulting in high entropy words and the second spilt comprising words with lower vector distance resulting in low entropy and continues till the end of N/5 splits (all the plurality of splits).

TABLE 1

Max Distance Vector for the Selected SeedListWords (SLWs) (Intersection corpus distance matrix )

| Words (SLWs) | Word 1 | Word 2 | Word 3 | Word 4 | Word 5 | Word 6 | Word 7 | Word 8 | Word 9 | Word 10 |
|---|---|---|---|---|---|---|---|---|---|---|
| Earth | 0.98 | 0.92 | 0.85 | 0.76 | 0.66 | 0.54 | 0.47 | 0.39 | 0.26 | 0.11 |
| Glimpse | 0.88 | 0.83 | 0.72 | 0.66 | 0.41 | 0.39 | 0.31 | 0.24 | 0.19 | 0.07 |
| Kashmir | 0.78 | 0.72 | 0.52 | 0.43 | 0.31 | 0.24 | 0.19 | 0.15 | 0.09 | 0.04 |
| Offers | 0.93 | 0.91 | 0.87 | 0.72 | 0.57 | 0.39 | 0.31 | 0.23 | 0.12 | 0.08 |
| Paradise | 0.97 | 0.89 | 0.76 | 0.62 | 0.55 | 0.51 | 0.49 | 0.36 | 0.26 | 0.12 |
| People | 0.82 | 0.74 | 0.71 | 0.56 | 0.48 | 0.39 | 0.36 | 0.22 | 0.11 | 0.09 |
| | | Generate = 0 ( higher entropy for adversary) | | | | | Generate = 1 (comparatively lower entropy) | | | |

matrix one at a time. Example passphrase corpus forth example recallable phrase spoken by user is provided in Table 3 below. This process continues for each tap of the regenerate button till exhaustion of the loop count=N/5.

TABLE 3

Select 5 Passphrases for the Mobile application

| Passphrases | SLWs | Generate = 0 | Generate = 1 |
|---|---|---|---|
| Passphrase 1 | Earth | Sphere Geography Land Ground Bhu | Bhumi Prithvi Globe World Planet |
| Passphrase 2 | Glimpse | View Gaze Look Eyeball Espy | Notice Percieve Sight Peek Glance |
| Passphrase 3 | Kashmir | Shikara Kahwa Paradise Lakes Mountains | Valleys Tourist Apples Saffron Jammu |
| Passphrase 4 | Offers | Propose Pass Grant Proffer Extend | Recommend Suggest Present Give Provide |
| Passphrase 5 | Paradise | Lotusland Fantasyland Dreamland Bliss Fairyland | Eden Utopia Nirvana Wonderland Heaven |
| Passphrase 6 (sixth row generated but not used since Miller's criteria is applied) | People | Masses Crowd Society Tribe Human | Citizen Ethnic Public Community Person |

Referring to Table 2, for each Seed word in the list, find the row(i) where the word SLW(i) is present. For each word, SLW(i) at Row(j,column=1), selected the words at Row(j,

TABLE 2

5 Passphrase illustrative words generated in each iteration for the words in the SLWs

| Words - SLWs | Word 1 | Word 2 | Word 3 | Word 4 | Word 5 | Word 6 | Word 7 | Word 8 | Word 9 | Word 10 |
|---|---|---|---|---|---|---|---|---|---|---|
| Earth | Sphere | Geography | Land | Ground | Bhu | Bhumi | Prithvi | Globe | World | Planet |
| Glimpse | View | Gaze | Look | Eyeball | Espy | Notice | Percieve | Sight | Peek | Glance |
| Kashmir | Shikara | Kahwa | Paradise | Lakes | Mountains | Valleys | Tourist | Apples | Saffron | Jammu |
| Offers | Propose | Pass | Grant | Proffer | Extend | Recommend | Suggest | Present | Give | Provide |
| Paradise | Lotusland | Fantasyland | Dreamland | Bliss | Fairyland | Eden | Utopia | Nirvana | Wonderland | Heaven |
| People | Masses | Crowd | Society | Tribe | Human | Citizen | Ethnic | Public | Community | Person |
| | | | Generate = 0 | | | | | Generate = 1 | | |

At step 210 of the method 200, the one or more hardware processors 104 are configured by the instructions to generate the passphrase corpus comprising a plurality of passphrases generated from at least one of the first spilt and the subsequent split by row wise selection of words of the passphrase 1<column<N) to construct passphrase PS(i) mapping to SLW(i). Create a corpus of 5 Passphrase for each of the word in the 5 SpokenSpeech.

At step 212 of the method 200, the one or more hardware processors 104 are configured by the instructions to randomly reading out and displaying a preset number of passphrases from among the plurality of phrases on a display screen of the user device, wherein a passphrase among the preset number of passphrases associated with the high entropy words is positioned on the display screen position having highest usability in context of the user. The user is provided a regenerate option for displaying a new preset number of passphrases from among the plurality of phrases on the display screen.

FIGS. 4A, 4B, 4C and 4D illustrate a display test method to determine screen usability of user. During passphrase selection process, the user device prompts the user to attempt a display test to determine the easily accessible display screen position of the user.

1. Physiology Speed Test of the User's Hand (Left/Right) and finger preference (Thumb, First finger). Total 4 choices. Location is Top and Bottom sort; total 2 choices. Overall choices is 8.
2. An application on user device such as a Mobile App can read out a sample text. The user is required to pick the text from a choice of 5 texts. (as in FIG. 4B)
3. There are 8 tests to undergo with different parameters (as in FIG. 4C and FIG. 4D).
4. Sort the User Recognition and Correct Selection of choices in order of least time to max time. In case of same values, ask user for preference.
5. Set Default Passphrase Layout to reflect the Maximum least-error layout for the user. The Entropy of each of the Row is obtained. Further with sum of all tests, max entropy row will be put at preferred location on the screen, having highest usability in context of the user
6. Left Aligned for RightHandUser and RigthAligned for left hand User.
7. TopFirst for FirstFinger User and BottomFirst for ThumbUser The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for high entropy passphrase generation, the method comprising:

prompting a user, via one or more hardware processors of a user device, to speak out a recallable phrase comprising a set of words using natural language of the user, wherein the recallable phrase is converted to a text using an Automated Speech Recognition (ASR) engine;

filtering, via the one or more hardware processors, a set of Seed List Words (SLWs) from the recallable phrase based on a personalized intersection corpus comprising a plurality of words correctly identifiable by the ASR engine;

generating, via the one or more hardware processors, a passphrase distance matrix for the set of SLWs by referring to an intersection corpus distance matrix generated for the personalized intersection corpus based on a vector distance between each of the plurality of words in the personalized intersection corpus, wherein column elements of the passphrase distance matrix comprise the set of SLWs in alphabetical order and row elements comprise a predefined number of passphrase words, for each SLW among the set of SLWs, identified based on descending order of the vector distance between each SLW and the plurality of words of the personalized intersection corpus, and wherein the descending order of vector distance arranges the predefined number of passphrase words from high entropy to low entropy value;

performing column wise splitting, via the one or more hardware processors, of the passphrase distance matrix to generate a plurality of splits, wherein each of the plurality of splits comprising a predefined number of words for each SLW, wherein a first split to a last split comprising words with higher vector distance resulting in high entropy words gradually shifting to lower vector distance resulting in low entropy;

generating, via the one or more hardware processors, a passphrase corpus comprising a plurality of passphrases generated from at least one of the first spilt and a subsequent split by a row wise selection of words of the passphrase matrix one at a time;

randomly reading out and displaying, via the one or more hardware processors, a preset number of passphrases from among the plurality of phrases on a display screen of the user device, wherein a passphrase among the preset number of passphrases associated with the high entropy words is positioned at a display screen position having highest usability in context of the user; and setting, via the one or more hardware processors, a user selected passphrase for device access authentication of the user device.

2. The processor implemented method of claim 1, wherein generating the personalized intersection corpus and the intersection corpus distance matrix is a one-time setup, comprising:

generating an original corpus by extracting words from preidentified literature comprising local language newspaper literature and local language school book literature accessible to the user, wherein the user is a Basic Emergent User (BEU);

prompting the user to speak out a plurality of phrases from the preidentified literature, wherein user is allowed to speak in natural language not restricted to follow accent, or be present in a defined environment while speaking out the plurality of phrases;

generating text for each of the plurality of phrases to generate a recorded corpus, comprising words recognized by the ASR engine;

performing intersection of the original corpus and the recorded corpus to generate the personalized intersection corpus, which represents a dataset common to ground truth and that of the ASR engine output; and generating the intersection corpus distance matrix based on the vector distance between each word of the personalized intersection corpus.

3. The processor implemented method of claim 1, wherein the user is provided a regenerate option for displaying a new preset number of passphrases from among the plurality of phrases on the display screen.

4. The processor implemented method of claim 1, wherein during passphrase selection process, the user device prompts the user to attempt a display test to determine the usability of display screen in context of the user.

5. A user device (100) for high entropy passphrase generation, the user device (100) comprising:

a memory (102) storing instructions;

one or more Input/Output (I/O) interfaces (106); and one or more hardware processors (104) coupled to the memory (102) via the one or more I/O interfaces (106), wherein the one or more hardware processors (104) are configured by the instructions to:

prompt a user, to speak out a recallable phrase comprising a set of words using natural language of the user, wherein the recallable phrase is converted to a text using an Automated Speech Recognition (ASR) engine;

filter a set of Seed List Words (SLWs) from the recallable phrase by based on a personalized intersection corpus comprising a plurality of words correctly identifiable by the ASR engine;

generate a passphrase distance matrix for the set of SLWs by referring to an intersection corpus distance matrix generated for the personalized intersection corpus based on a vector distance between each of the plurality of words in the personalized intersection corpus, wherein column elements of the passphrase distance matrix comprise the set of SLWs in alphabetical order and row elements comprise a predefined number of passphrase words, for each SLW among the set of SLWs, identified based on descending order of the vector distance between each SLW and the plurality of words of the personalized intersection corpus, and wherein the descending order of vector distance arranges the predefined number of passphrase words from high entropy to low entropy value;

perform column wise splitting of the passphrase distance matrix to generate a plurality of splits, wherein each of the plurality of splits comprising a predefined number of words for each SLW, wherein a first split to a last split comprising words with higher vector distance resulting in high entropy words gradually shifting to lower vector distance resulting in low entropy;

generate a passphrase corpus comprising a plurality of passphrases generated from at least one of the first spilt and a subsequent split by a row wise selection of words of the passphrase matrix one at a time;

randomly reading out and displaying a preset number of passphrases from among the plurality of phrases on a display screen of the user device, wherein a passphrase among the preset number of passphrases associated with the high entropy words is positioned at a display screen position having highest usability in context of the user; and setting a user selected passphrase for device access authentication of the user device.

6. The user device of claim 5, wherein the one or more hardware processor are configured to generate the personalized intersection corpus and the intersection corpus distance matrix using a one-time setup by:

generating an original corpus by extracting words from preidentified literature comprising local language newspaper literature and local language school book literature accessible to the user, wherein the user is a Basic Emergent User (BEU);

prompting the user to speak out a plurality of phrases from the preidentified literature, wherein user is allowed to speak in natural language not restricted to follow accent, or be present in a defined environment while speaking out the plurality of phrases;

generating text for each of the plurality of phrases to generate a recorded corpus, comprising words recognized by the ASR engine;

performing intersection of the original corpus and the recorded corpus to generate the personalized intersection corpus, which represents a dataset common to ground truth and that of the ASR engine output; and generating the intersection corpus distance matrix based on the vector distance between each word of the personalized intersection corpus.

7. The user device of claim 5, wherein the user is provided a regenerate option for displaying a new preset number of passphrases from among the plurality of phrases on the display screen.

8. The user device of claim 5, wherein during passphrase selection process, the user device prompts the user to attempt a display test to determine usability of display screen position in context of the user.

9. One or more non-transitory machine-readable information storage mediums comprising one or more instructions which when executed by one or more hardware processors cause:

prompting a user to speak out a recallable phrase comprising a set of words using natural language of the user, wherein the recallable phrase is converted to a text using an Automated Speech Recognition (ASR) engine;

filtering a set of Seed List Words (SLWs) from the recallable phrase based on a personalized intersection corpus comprising a plurality of words correctly identifiable by the ASR engine;

generating a passphrase distance matrix for the set of SLWs by referring to an intersection corpus distance matrix generated for the personalized intersection corpus based on a vector distance between each of the plurality of words in the personalized intersection corpus, wherein column elements of the passphrase distance matrix comprise the set of SLWs in alphabetical order and row elements comprise a predefined number of passphrase words, for each SLW among the set of SLWs, identified based on descending order of the vector distance between each SLW and the plurality of words of the personalized intersection corpus, and wherein the descending order of vector distance arranges the predefined number of passphrase words from high entropy to low entropy value;

performing column wise splitting of the passphrase distance matrix to generate a plurality of splits, wherein each of the plurality of splits comprising a predefined number of words for each SLW, wherein a first split to a last split comprising words with higher vector distance resulting in high entropy words gradually shifting to lower vector distance resulting in low entropy;

generating a passphrase corpus comprising a plurality of passphrases generated from at least one of the first spilt and a subsequent split by a row wise selection of words of the passphrase matrix one at a time;

randomly reading out and displaying a preset number of passphrases from among the plurality of phrases on a display screen of the user device, wherein a passphrase among the preset number of passphrases associated with the high entropy words is positioned at a display screen position having highest usability in context of the user; and setting a user selected passphrase for device access authentication of the user device.

10. The one or more non-transitory machine-readable information storage mediums of claim 9, wherein generating the personalized intersection corpus and the intersection corpus distance matrix is a one-time setup, comprising:

generating an original corpus by extracting words from preidentified literature comprising local language newspaper literature and local language school book literature accessible to the user, wherein the user is a Basic Emergent User (BEU);

prompting the user to speak out a plurality of phrases from the preidentified literature, wherein user is allowed to speak in natural language not restricted to follow accent, or be present in a defined environment while speaking out the plurality of phrases;

generating text for each of the plurality of phrases to generate a recorded corpus, comprising words recognized by the ASR engine;

performing intersection of the original corpus and the recorded corpus to generate the personalized intersection corpus, which represents a dataset common to ground truth and that of the ASR engine output; and generating the intersection corpus distance matrix based on the vector distance between each word of the personalized intersection corpus.

11. The one or more non-transitory machine-readable information storage mediums of claim 9, wherein the user is provided a regenerate option for displaying a new preset number of passphrases from among the plurality of phrases on the display screen.

12. The one or more non-transitory machine-readable information storage mediums of claim 9, wherein during passphrase selection process, the user device prompts the user to attempt a display test to determine the usability of display screen in context of the user.

* * * * *